United States Patent [19]

Hafner et al.

[11] Patent Number: 4,800,912

[45] Date of Patent: Jan. 31, 1989

[54] ELECTROMAGNETICALLY OPERABLE VALVE AND METHOD FOR PRODUCING SUCH A VALVE

[75] Inventors: Udo Hafner, Lorch; Rudolf Krauss, Stuttgart; Rudolf Sauer, Benningen, all of Fed. Rep. of Germany

[73] Assignee: Robert Bosch GmbH, Stuttgart, Fed. Rep. of Germany

[21] Appl. No.: 723,229

[22] Filed: Apr. 15, 1985

[30] Foreign Application Priority Data

May 18, 1984 [DE] Fed. Rep. of Germany ....... 3418436

[51] Int. Cl.$^{4}$ .................... F16L 55/18

[52] U.S. Cl. .................... 137/15; 251/129.16; 239/585

[58] Field of Search .................... 239/585; 251/129.01, 251/129.05, 129.15, 129.16, 129.14; 137/15

[56] References Cited

U.S. PATENT DOCUMENTS 4,455,982 6/1984 Hafner et al. .................... 239/585

4,476,423 11/1983 Krauss et al. .................... 239/585

*Primary Examiner*—Robert E. Garrett

*Assistant Examiner*—Noah Kamen

*Attorney, Agent, or Firm*—Edwin E. Greigg

[57] ABSTRACT

An electromagnetic valve consists of two valve housing parts, connected by crimping and axially braced, and having a magnetic pipe care therein. A flat armature is positively connected with a spherically shaped valve closing part, which extends through a central opening in a guide membrane for cooperation with a valve seat. The guide membrane rests via an outer circumference on a collar and is supported there via the axial tensioning force between the valve housing parts in assembled form. The guide membrane is welded to the collar on the outer circumference upon at least two points. Before the valve housing parts are combined, the guide membrane, abutting the collar, in concentrically guided into position by a centering body, having a slightly larger diameter than the valve closing part, on the valve seat and is welded at said points in this position. Thereupon the centering body is removed and the actual assembly of the valve is performed.

2 Claims, 1 Drawing Sheet

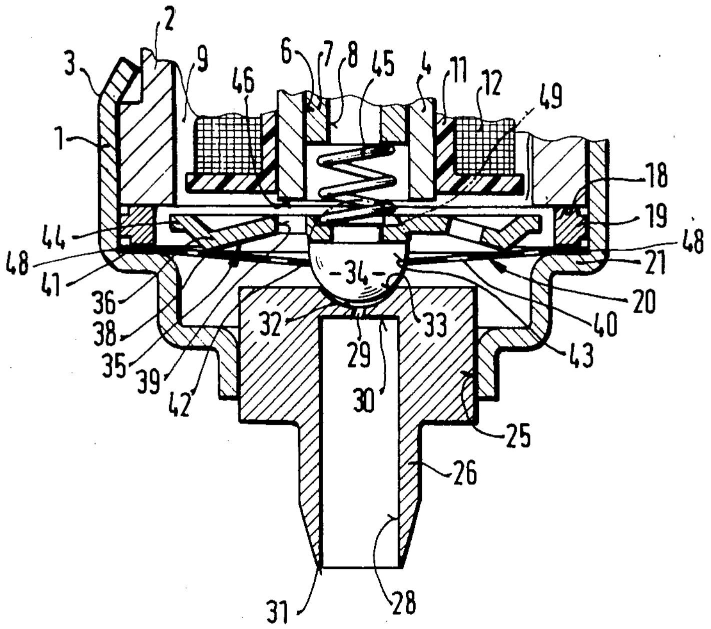
2
3
9
46
6
7
8
45
4
11
12
49
1
18
19
44
48
48
21
41
36
34
20
38
32
33
40
35
29
43
39
42
30
25
26
31
28

ELECTROMAGNETICALLY OPERABLE VALVE AND METHOD FOR PRODUCING SUCH A VALVE

BACKGROUND OF THE INVENTION

The invention is based on an electromagnetically operable valve as described hereinafter. A valve is already known wherein the valve closing part is radially guided with slight play through the centering opening of a guide membrane. Installing such a valve, however, poses the problem that only in exceptional cases can a truly concentric annular slit be formed between the valve closing part and the centering opening of the guide membrane, so that in the majority of cases the valve closing part abuts the centering opening only with a portion of its circumference. A subsequent deformation of the valve housing in an axial direction causes a subsequent change of the opening stroke to be brought about which may in turn bring about a small radial displacement of the valve seat.

Furthermore, due to the radial displacement of the valve seat and the one-sided engagement by the valve closing part with the centering opening, when the valve is closing, it may occur, that the valve closing part is not guided concentrically relative to the valve seat, thereby preventing uniform sealing around its circumference. This condition can cause leaks, to occur, where the valve closing part and valve seat strike harder in certain places and a force component is applied to the guide membrane on the valve closing part in the direction of the opening of the valve, which force can result in deformation thereof and lead to a change in the injection times during the lifetime of the valve.

Applications (commonly assigned) are pending for similar and related inventions under application Ser. Nos. 518,268, now U.S. Pat. No. 4,527,744; 565,063, now U.S. Pat. No. 4,582,085; and 601,403, now U.S. Pat. No. 4,666,088.

OBJECT AND SUMMARY OF THE INVENTION

It is an object of the invention to provide a valve in which simply and effortlessly the centering opening of the guide membrane can be oriented more concentrically with respect to the valve seat than heretofore possible, thereby assuring trouble-free operation of the valve during its life.

The invention will be better understood and further objects and advantages thereof will become more apparent from the ensuing detailed description of a preferred embodiment taken in conjunction with the drawing.

BRIEF DESCRIPTION OF THE DRAWING

The sole figure shows in a schematic cross-sectional view a preferred embodiment of the present invention.

DESCRIPTION OF THE PREFERRED EMBODIMENT

The fuel injection valve for a fuel injection device, shown in exemplary embodiment by the valve in the drawing, proposed by this invention may serve for the injection of fuel into the intake line of fuel-compressing, externally ignited internal combustion engines. A first valve housing part is shown as 1 and is produced, as is the second valve housing part 2, by forming without cutting, such as by deep drawing, rolling or the like. The valve housing parts 1, 2 partially overlap and are connected in a known manner, such as by means of a crimp 3, and are thus made axially secure against movement. A fuel supply line 4 in the form of a connecting line is inserted om a sealing fashion into the valve housing part 2; this line is formed from a ferromagnetic material, and thus also serves as the inner core of the electromagnetically operated valve.

Disposed concentrically to the valve axis, the fuel supply pipe 4 has an inner bore 6, into which has been forced an adjustment sleeve 7 having a through-hole 8. The upper end of the fuel supply pipe 4 which extends from the valve housing part 2 is connected to a fuel supply, for instance a fuel distributing line which is not shown, but is well-known in the art. The other lower end of the fuel supply pipe 4 extends into an inner chamber 9 of the valve housing 1 and has an insulating support 11, the latter arranged to surround at least partially a magnetic core 12. A spacing ring 19 abuts against the frontal area 18 of the second valve housing part 2 and beneath this ring is positioned a guide membrane 20. A shoulder 21 of the first valve housing part 1 is turned inwardly to engage with the lower side of the guide member 20, thus providing an axial tensioning force to maintain the positions of the spacing ring 19 and the guide membrane 20.

The first valve housing part 1 has a coaxial holding bore 25, into which a nozzle body 26 is inserted and fastened by, for instance, welding or brazing. The nozzle body 26 has a preparation bore 28 in the form of a blind bore, preferably cylindrical, into the bottom 30 of which discharges at least one fuel supply bore 29, which serves to meter the fuel. The fuel supply bore 29 preferably ends in such a way in the bottom 30 of the preparation bore 28 that a tangentially directed flow into the preparation bore 28 is avoided and that the fuel stream first leaves the fuel supply bore 29 without touching the walls and then hits the wall of the preparation bore 28, thereby being distributed in a film in the approximate shape of a parabola and flowing towards the nozzle body end 31. The fuel supply bore 29 is inclined in relation to the valve axis and originates in a cup-shaped chamber 32, formed in the nozzle body 26. Upstream of the former a concave valve seat 33 is disposed in the nozzle body 26 and cooperates with a spherical valve closing part 34. In order to obtain a small dead volume, the volume of the cup-shaped chamber 32 should be as small as possible in the area between where the valve closing part 34 abuts the valve seat 33.

The valve closing part 34 is connected, on the side away from the valve seat 33, with a flat armature 35, by, for instance, welding or brazing. The flat armature 35 can be formed by stamping or extruding and can, for instance, have an annular guide collar 36, which projects downward and abuts against an annular guide area 38 of the guide membrane 20 on the side away from the valve seat 33. Flow openings 39 in the flat armature 35 and flow grooves 40 in the guide membrane 20 permit an unhampered fuel flow around the flat armature 35 and the guide membrane 20. The guide membrane 20, fastened at its circumference in a shoulder 41 between the spacing ring 19 and the shoulder 21, has a central area 42 surrounding a central opening 43, through which opening extends the movable valve part 34, mounted almost without play therebetween, which can be centered in a radial direction. The fastening to the housing of the guide membrane 20 between the spacing ring 19 and the shoulder 21 is accomplished in a plane passing through the center, or as near as possible through the center, of the spherical valve part 34 abutting against the valve seat 33. By means of the guide area 38 of the guide membrane 20, acting on the guide collar 36 of the flat armature 35, the flat armature 35 is located as parallel as possible to the frontal area 18 of the second valve housing part 2 and partially extends beyond it into a circumferential area 44.

A compression spring 45, acting at one end against the flat armature 35 and at the other against adjustment sleeve 7 acts to bias the valve art 34 in the direction of the valve seat 33. The spring is disposed in the inner bore 6 of the fuel supply pipe 4, which extends close to the flat armature 35. The fuel supply pipe 4, which serves as the inner core, is inserted into the second valve housing part 2 far enough so that a small air gap remains between its front area 46 which extends toward the armature 35 and the armature 35 itself when, during excitation of the magnetic core 12, the armature is drawn by its circumferential area 44 against the frontal area 18 of the second valve housing part 2. When the magnetic core 12 is not excited, the armature is biased by the compression spring 45 in the direction of the valve seat 33. The magnetic circuit extends through the outside of the valve housing part 2 and the inside of the fuel supply pipe 4 and is closed through the armature 35.

In accordance with the present invention, the guide membrane 20 is welded upon its outer circumference 41, via at least two points 48, with the shoulder 21 of the valve housing part 1. This is accomplished by inserting the guide membrane 20 during assembly abuttingly against the shoulder 21 in the first valve housing part 1 connected with the nozzle body 26. Next, a preferably ball-shaped centering body 49, shown in the drawing by dotted lines, is inserted through the centering opening 43 of the guide membrane 20 and placed against the valve seat 33. The centering body 49 has a slightly larger diameter than the valve closing part 34, for instance a diameter larger by 0.03 mm. The guide membrane 20, thus aligned concentrically relative to the valve seat 33 by the centering body 49, is now welded on its outer circumference 41 with the shoulder 21 of the first valve housing part 1 at a minimum of two points 48, but for example at six points 48 evenly distributed around the outer cirumference of the membrane. If the centering body 49 is now removed and replaced by the valve closing part 34, connected with the flat armature 35, an even annular slit between the circumference of the valve closing part 34 and the central opening 43 of the guide membrane 20 results, thereby providing a precise and accurate guidance of the valve closing part 34. Continuing the assembly of the valve, the magnetic core 12 with the fuel supply pipe 4 and the spacing ring 19 are assembled and the valve housing parts 1, 2 are connected by means of the crimp 3 and made axially secure.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method for assembly of an electromagnetically actuatable fuel injection valve for fuel injection systems of internal combustion engines, having first and second valve housing portions, said first valve housing portion including a valve seat, and further having a coil assembly comprising a magnetic coil attached to a core of ferromagnetic material and an armature firmly connected to a valve closing part arranged to cooperate with said valve seat, said valve closing part being guided by means of a guide diaphragm supported under spring tension on a guide collar disposed on said armature on the side thereof oriented toward the valve seat, said guide diaphragm serving thereby to guide said armature parallel to said valve seat, comprising the steps of:
   (a) positioning said guide diaphragm via an outer circumference upon a shoulder in said first valve housing portion;
   (b) inserting a centering body into a centering opening of said guide diaphragm so it radially touches said guide diaphragm, said centering body disposed to sit close to said valve seat to define a centered position for said guide diaphragm;
   (c) welding said guide diaphragm upon at least two points of its outer circumference to said shoulder to retain said centered position;
   (d) removing said centering body;
   (e) assembling said armature and said valve closing part together as a unit in axial alignment;
   (f) inserting said unit together with said magnetic coil into said first valve housing, and
   (g) clamping axially said second valve housing part to said first valve housing part so that a tensioning force is exerted upon said outer circumference of said guide diaphragm to positively retain said centered position.

2. A method as defined by claim 1, further wherein said centering body is ball-shaped.

* * * * *